United States Patent [19]

Parisi

[11] Patent Number: 5,237,383
[45] Date of Patent: Aug. 17, 1993

[54] APPARATUS FOR THE MEASURING AND CONTROLLING THE ECCENTRICITY OF COLORED COATING LAYER OF AN OPTICAL FIBER

[75] Inventor: Giuseppe Parisi, Torino, Italy

[73] Assignee: SIP - Società Italiana Per l'Esercizio Delle Telecomunicazioni P.A., Torino, Italy

[21] Appl. No.: 754,441

[22] Filed: Sep. 3, 1991

[30] Foreign Application Priority Data

Sep. 10, 1990 [IT] Italy ............................. 67677 A/90

[51] Int. Cl.$^5$ .................. G01B 11/06; G01N 21/89; B05C 11/00; B05D 1/26
[52] U.S. Cl. ........................... 356/73.1; 118/712; 250/358.1; 250/359.1; 356/357; 427/10
[58] Field of Search .............. 356/73.1, 357, 382; 118/691, 712; 427/10; 250/563, 358.1, 359.1, 360.1

[56] References Cited

U.S. PATENT DOCUMENTS

| | | | |
|---|---|---|---|
| 4,042,723 | 8/1977 | Presby | 356/73.1 X |
| 4,208,126 | 6/1980 | Cheo et al. | 356/73.1 X |
| 4,370,355 | 1/1983 | Niesse | 427/10 X |
| 4,390,897 | 6/1983 | Smithgall, Sr. | 356/73.1 X |
| 4,881,489 | 11/1989 | Klebl | 118/712 X |
| 4,909,631 | 3/1990 | Tan et al. | 356/382 |
| 4,952,226 | 8/1990 | Frazee et al. | 356/73.1 X |
| 4,988,875 | 1/1991 | Ortiz et al. | 250/563 X |

FOREIGN PATENT DOCUMENTS 0294889 12/1988 European Pat. Off. .
2402480 8/1979 Fed. Rep. of Germany .
2466747 10/1981 France .

OTHER PUBLICATIONS

H. M. Presby "Geometrical Uniformity of Plastic Coatings on Optical Fibers"; pp. 1525-1537; 1976, vol. 55, No. 10; Dec. 1976.

D. H. Smithgall et al; "High-Speed Measurement and Control of Fiber-Coating Concentricity"; pp. 2065-2080; 1981, vol. 60, No. 9 Nov. 1981.

NIST National Institute of Standards and Technology-Special Publication 792-Technical Digest Symposium on Optical Fiber . . . 1990 pp. 67-70.

Primary Examiner—Vincent P. McGraw
Attorney, Agent, or Firm—Herbert Dubno

[57] ABSTRACT

The apparatus for measuring and controlling the eccentricity of a colored coating layer of an optical fiber allows continuous on-line measurement of the eccentricity of the colored layer and high-speed control of the devices envisaged for its deposition in order to make corrections possible. The measurement is carried out by launching into the fiber a monochromatic light beam with a wavelength in the near infrared and by analyzing the interference patterns obtained by a TV camera sensitive to such a wavelength.

5 Claims, 1 Drawing Sheet

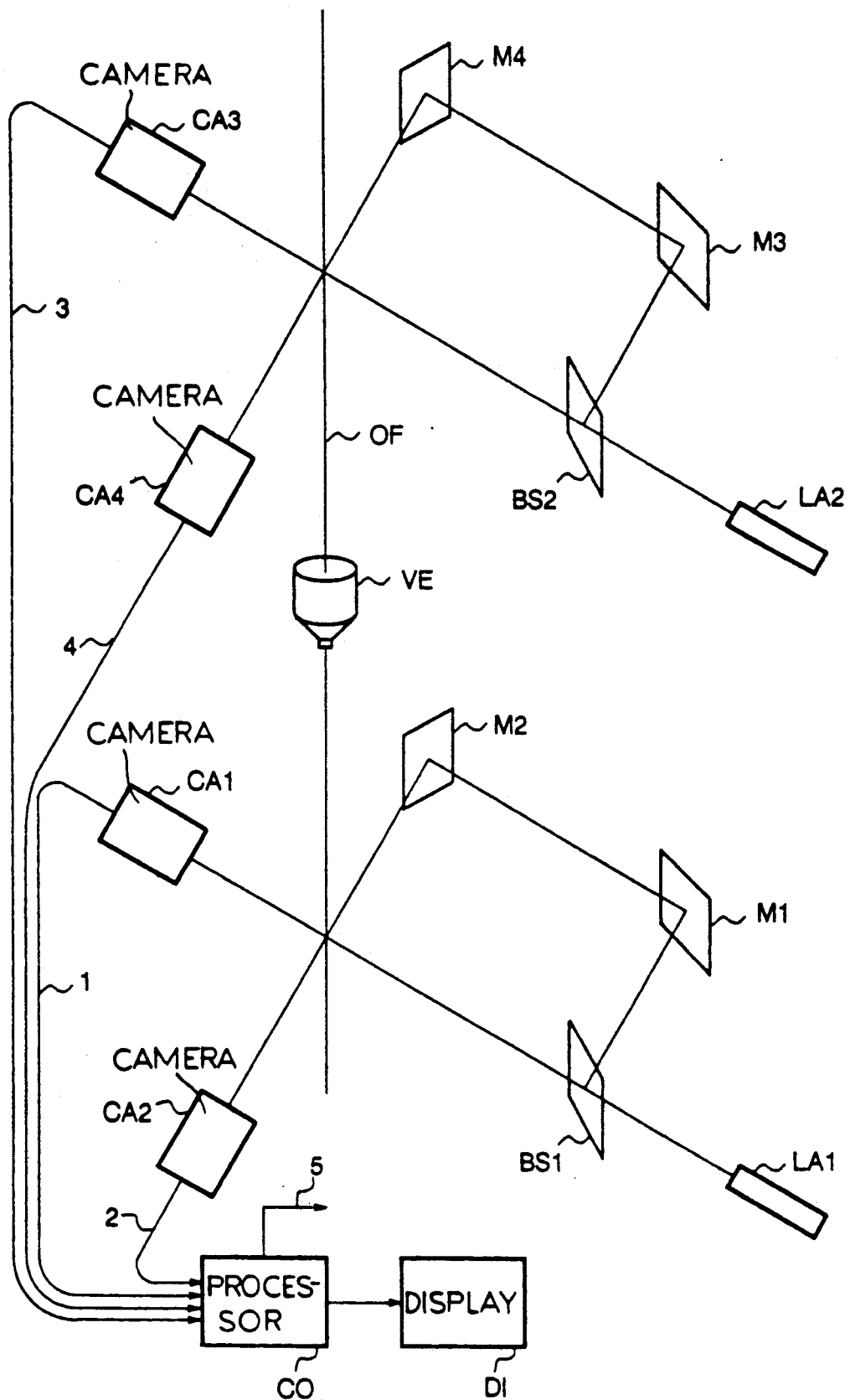

APPARATUS FOR THE MEASURING AND CONTROLLING THE ECCENTRICITY OF COLORED COATING LAYER OF AN OPTICAL FIBER

FIELD OF THE INVENTION

The present invention relates to fabrication of optical fibers used for the transmission of light radiation in optical telecommunications systems and, more particularly, to an apparatus for measuring and controlling the eccentricity of a colored coating layer of an optical fiber.

BACKGROUND OF THE INVENTION

It is known that during the drawing process, optical fibers to be used in telecommunications are covered with one or more layers of organic material in order to protect their surfaces. The optical fiber with a standard diameter of 125 μm, is coated until it reaches a diameter of about 200 μm with a primary soft coating with a low coefficient of elasticity. Then, still during the drawing step a further secondary rigid coating with higher coefficient of elasticity is deposited. The choice of coating layer thickness is particularly critical, since on it depends the origin of mechanical stresses in the fiber which can give rise to microbendings. Such fiber deformation can cause a loss in the light signal transmission. By this reason such deformations have to be avoided as much as possible.

Finally, before fabricating a cable containing a plurality of optical fibers, each fibre is subjected to a further coating operation with a colored resin layer, which raises its external diameter to about 265 μm. The latter coating serves to establish a code for recognizing each fiber from among those contained in the cable. The materials used for the coating are generally mixtures of acrylic monomers and oligomers, duly enriched, which after deposition are caused to polymerize by ultraviolet radiation.

Optical and mechanical fiber characteristics are highly affected by the coating characteristics, such as layer thickness and its concentricity with respect to the fiber, the polymer type, the degree of polymerization achieved, ageing, etc. Namely, an eccentricity of the colored coating layer exceeding 5% can cause nonuniformity in the strains acting on the fiber sufficient to induce microbending. These phenomena can be emphasized at low temperatures (−20° C.), where most polymers, being below their vitreous transition temperatures, exert correspond with difficulty and differently from layer to layer to the internal stresses, affecting significantly the optical fiber characteristics.

Primary and secondary coating eccentricity measurement is usually carried out during fiber drawing, so as to permit a ready adjustment of the devices acting on the mutual positioning between the fiber and deposition nozzle to the coating materials in case of a concentricity error. The measurement method described e.g. in the article entitled "High-Speed Measurement and Control of Fiber-Coating Concentricity" written by D. H. Smithgall and R. R. Frazee and issued in The Bell System Technical Journal, November 1981, pages 2065-2080, consists of illuminating the coated fiber with coherent light and of examining the symmetry of obtained interference fringes.

The light radiation, emitted by a laser source operating in the visible spectrum portion, is split into two beams and by means of mirrors each beam is sent along perpendicular directions towards the fiber, perpendicularly to its axis, so as to detect concentricity errors, whatever the fiber location. The interference fringes relevant to the two orthogonal directions are displayed on two screens placed behind the fiber and are taken by two TV cameras for a further processing of the corresponding electrical signals.

A similar method, described in the article entitled "Geometrical Uniformity of Plastic Coating on Optical Fibers" written by H. M. Presby and issued in The Bell System Technical Journal, December 1976, pages 1525-1537, analyzes the interference fringes obtained on screens placed on the same side of the light source, by using light reflected by the fiber surface, instead of transmitted light.

The methods used to measure primary and secondary coating eccentricity, cannot be directly used to measure colored resin layer eccentricity, since the pigments used for coloring absorb light just in the spectral interval at which the measurement takes place, therefore no interference patterns are obtained either in transmission, or in reflection.

Nowadays the test of the eccentricity of the coloured layer can be carried out only off line, by incorporating a fiber trunk into a block of transparent resin, by sectioning the block perpendicular to the fiber axis so as to lap the fiber end face and afterwards by observing it with a microscope. This method does not obviously permit a continuous measurement of the colored layer characteristics, nor an on line adjustment of the devices provided for the resin deposition during the process.

OBJECT OF THE INVENTION

It is an object of the invention to overcome these disadvantages and provide an improved apparatus for measuring and controlling the eccentricity of the colored coating layer of optical fibers, which allows continuous on-line measurement of colored layer eccentricity and high-speed control of the devices envisaged for its deposition in order to make possible corrections.

BRIEF DESCRIPTION OF THE DRAWINGS

The foregoing and other characteristics of the present invention will be made clearer by the following description of a preferred embodiment thereof given by way of a non-limiting example, and by the annexed drawing the sole FIGURE of which is a schematic representation of the apparatus provided by the invention.

SPECIFIC DESCRIPTION

The apparatus operation is based on the fact that pigmented polymers, used for the embodiment of the colored layer, have the characteristic of being practically transparent in the portion of optical spectrum ranging from 850 and 2500 nm, in the near infra-red. Therefore the apparatus uses as a light source a laser capable of emitting in this spectrum portion, namely an Nd-YAG laser, which emits at the wavelength of 1064 or 1319 nm, an HeNe laser, which emits at the wavelength of 1150 or 1520 nm, or a semiconductor laser which can be chosen with emission wavelengths comprised between 850 and 900, 1280 and 1320 or 1480 and 1600 nm.

A laser of the type above, denoted by LA1 in the figure, emits a monochromatic beam which, after traversing a semitransparent mirror BS1, is partly transmitted and impinges upon the optical fiber OF perpendicularly to the axis, and is partly reflected towards a first mirror M1, then towards a second mirror M2 and finally towards the optical fiber OF, perpendicularly to the fibre axis and to the axis of the other portion of the optical beam.

At the point where the two beams encounter the optical fiber the colored coating layer has already been deposited, since the fibre has passed through a nozzle VE, containing non-polymerized resins. As a consequence, on the screens ot two TV cameras CA1 and CA2, placed along the directions of the two optical beams, two interference patterns are originated which are more or less symmetrical with respect to a central brighter line, according to the colored coating layer eccentricity. TV cameras CA1 and CA2, sensitive to the wavelength of the beam emitted by laser LA1, supply on the corresponding output wires 1 and 2 electrical signals for the successive processing operations.

Upstream of nozzle VE the fiber not yet coloured can be subjected to a measurement analogous to the one discussed in order to check the concentricity of the primary and secondary coatings. To this end a laser of the previous type, or a laser with emission in the visible portion of the optical spectrum can be used, namely a HeNe laser with 632 nm emission. Such a laser, denoted by LA2 in the figure, emits a monochromatic beam, which, after traversing a semitransparent mirror BS2, is partly transmitted and impinges upon the optical fiber OF perpendicularly to the axis, and is partly reflected towards a first mirror M3, then towards a second mirror M4 and finally towards the optical fiber OF, perpendicularly to the fiber axis and to the axis of the other portion of the optical beam.

The illuminated fiber generates on the screens of two TV cameras CA3 and CA4, placed along the directions of the optical beams, two interference patterns more or less symmetrical with respect to the brighter central line, according to the eccentricity of primary and secondary coatings. TV cameras CA3 and CA4, sensitive to wavelength of the beam emitted by laser LA2, supply on the corresponding output wires 3 and 4 electrical signals which, with those present on wires 1 and 2, are led to a processing unit CO.

This processing unit CO drives a display unit D1, which permits the operator to visually control the trend of fiber coloring process, and supplies on connection 5 electrical signals apt to adjust the devices acting on the mutual positioning between fiber OF and the deposition nozzle for coating materials VE, so as to automatically make the necessary corrections in case of a concentricity error.

From the information on the eccentricity before and after the deposition of the colored coating, it is possible to adjust the apparatus so as to compensate for the possible eccentricity in the primary and secondary coating with opposite concentricity of the colored layer or to deposit a colored layer perfectly concentric with the primary and secondary coatings.

It is clear that what described has been given only by way of a non-limiting example. Variations and modifications are possible without departing the scope of the claims. E.g., the apparatus can be used analogously to what has been described also by using the interference patterns obtained from the light reflected by the coating layer, instead of the transmitted light.

I claim:

1. A method of controlling a coating of an optical fiber, comprising the steps of:
    (a) continuously applying a colored coating to an optical fiber;
    (b) splitting a beam from a laser operating in a near infrared region to which said colored coating is transparent into two rays;
    (c) training one of said rays at said coating of said optical fiber substantially perpendicular thereto and training the other of said rays at said coating of said optical fiber substantially perpendicular thereto and to said one of said rays, thereby forming transmitted interference patterns along lines of said rays;
    (d) training respective video cameras on said optical fiber along each of said lines, thereby recording the respective interference patterns;
    (e) processing signals simultaneously received from said video cameras and representing said interference patterns to determine eccentricity of said colored coating; and
    (f) generating a control signal representing eccentricity of said colored coating and controlling on line mutual positions of said optical fiber and a device for applying said colored coating to the optical fiber.

2. The method defined in claim 1, further comprising the steps of:
    directing a first ray split from another laser beam against said optical fiber upstream of the coating thereof in step (a) in a direction substantially perpendicular to said optical fiber and a second ray from said other laser at said optical fiber perpendicular to said optical fiber and to said first ray from said optical fiber to generate interference patterns in line with the rays from said other laser to determine eccentricity of a prior layer deposited on said optical fiber, and detecting interference patterns in line with the rays from said other laser to provide outputs coordinated at the outputs of the cameras used in step (c).

3. An apparatus for measuring and controlling eccentricity of a color coating on an optical fiber, comprising:
    means for continuously depositing on an optical fiber previously provided with primary and secondary coatings, a colored coating;
    a laser operating in a near infra-red spectrum range for producing a monochromatic light beam;
    means for splitting said beam into two rays;
    means for training one of said rays onto said colored coating substantially perpendicular to said optical fiber and for training the other of said rays onto said colored coating of said optical fiber substantially perpendicular to said optical fiber and to said first ray, whereby respective interference patterns are formed in line with said first and other rays;
    respective video trained on said colored coating of said optical fiber in line with the respective rays for detecting said interference patterns; and
    means connected with said cameras for outputting a control signal representing eccentricity of said colored coating for adjustment of relative portions of the means for applying said colored coating to said optical fiber.

4. The apparatus defined in claim 3, further comprising a monochromatic light source capable of generating interference patterns relevant to a measurement of an eccentricity of said primary and secondary coatings;

means for launching into said primary and secondary coatings on said optical fiber upstream of the means for applying the colored coating thereto, respective rays perpendicular to one another and said optical fiber; and a pair of video cameras aligned with the rays from said source and respective to respective interference patterns therefrom for supplying signals representing eccentricity of said primary and secondary coatings to said means for outputting.

5. The apparatus defined in claim 3 wherein said means for output includes a processor responsive to signals from all of said cameras;

a display unit connected to said processor for displaying eccentricity, a connection from said processor providing as signal for reciprocally positioning said means for applying the colored coating and the optical fiber.

* * * * *